(12) United States Patent
Kleiner et al.

(10) Patent No.: US 8,568,068 B2
(45) Date of Patent: Oct. 29, 2013

(54) ROTATABLY DRIVABLE CUTTING TOOL

(75) Inventors: Gilbert Kleiner, Inzigkofen (DE);
Gerhard Schanz, Burladingen (DE)

(73) Assignee: Guehring OHG, Albstadt (DE)

(*) Notice: Subject to any disclaimer, the term of this patent is extended or adjusted under 35 U.S.C. 154(b) by 0 days.

(21) Appl. No.: 12/552,640

(22) Filed: Sep. 2, 2009

(65) Prior Publication Data
US 2010/0143055 A1    Jun. 10, 2010

Related U.S. Application Data

(63) Continuation of application No. PCT/DE2008/000740, filed on Apr. 30, 2008.

(30) Foreign Application Priority Data

May 20, 2007   (DE) .......................... 10 2007 023 168

(51) Int. Cl.
*B23C 5/28*    (2006.01)
*B23B 51/06*    (2006.01)

(52) U.S. Cl.
USPC ................ 409/131; 408/1 R; 408/57; 407/11; 409/136

(58) Field of Classification Search
USPC ....... 408/1 R, 56, 57, 59, 227, 230, 144, 222; 407/11; 409/131–132, 135, 136
IPC .................................... B23B 51/06; B23C 5/28
See application file for complete search history.

(56) References Cited

U.S. PATENT DOCUMENTS

| | | | |
|---|---|---|---|
| 83,371 A * | 10/1868 | Foster | .............................. 408/57 |
| 1,022,135 A | 4/1912 | Heinkel et al. | |
| 1,341,565 A | 5/1920 | Krepps | |
| 1,384,733 A | 7/1921 | Woods | |
| 1,400,021 A | 12/1921 | Gordon | |
| 2,284,522 A * | 5/1942 | Keen | ............................. 408/230 |
| 2,348,874 A | 5/1944 | Andreasson | |
| 2,411,209 A | 11/1946 | Furth et al. | |
| 2,646,701 A | 7/1953 | Letien | |
| 2,741,936 A * | 4/1956 | Wohlfahrt | ..................... 408/1 R |

(Continued)

FOREIGN PATENT DOCUMENTS

DE       73 29 780           11/1974
DE       2649323 A1 *    7/1977

(Continued)

OTHER PUBLICATIONS

JPO website translation of JP 10-138047, printed Nov. 2011.*

(Continued)

*Primary Examiner* — Daniel Howell
(74) *Attorney, Agent, or Firm* — Burr & Brown

(57) ABSTRACT

A tool comprising a cutting section on which a multiplicity of blades or cutting edges and flutes are formed; a shank section, which forms a chucking section on a side which faces away from the cutting section, wherein a number of fluid channels which corresponds to the number of flutes is formed in the chucking section in such a manner that the fluid which emerges from axial discharge openings of the chucking section can be fed in a free jet along the shank into in each case one associated flute of the cutting section. Also, a method for supplying the blades of such a tool.

22 Claims, 2 Drawing Sheets

(56) References Cited

U.S. PATENT DOCUMENTS

| | | | |
|---|---|---|---|
| 2,903,921 A * | 9/1959 | Andreasson | 408/59 |
| 2,912,887 A * | 11/1959 | Andreasson | 408/57 |
| 3,045,513 A * | 7/1962 | Andreasson | 408/59 |
| 3,199,381 A * | 8/1965 | MacKey | 408/226 |
| 3,359,837 A * | 12/1967 | Andreasson | 408/230 |
| 3,460,410 A * | 8/1969 | Briles | 408/57 |
| 3,518,917 A | 7/1970 | Sluhan | |
| 4,113,405 A * | 9/1978 | Dillinger | 408/226 |
| 4,134,704 A * | 1/1979 | Jackley et al. | 408/57 |
| 4,268,197 A | 5/1981 | Burgsmuller | |
| 4,475,853 A * | 10/1984 | Morgan | 409/137 |
| 4,500,234 A | 2/1985 | Orth et al. | |
| 5,085,540 A * | 2/1992 | Pagliaccio | 407/11 |
| 5,163,790 A * | 11/1992 | Vig | 408/57 |
| 5,230,593 A * | 7/1993 | Imanaga et al. | 408/230 |
| 5,328,307 A | 7/1994 | Fees et al. | |
| 5,378,091 A * | 1/1995 | Nakamura | 409/132 |
| 5,839,897 A | 11/1998 | Bordes | |
| 6,030,155 A | 2/2000 | Scheer et al. | |
| 6,045,301 A | 4/2000 | Kammermeier et al. | |
| 6,116,825 A | 9/2000 | Kammermeier et al. | |
| 6,206,617 B1 | 3/2001 | Kawazoe et al. | |
| 6,648,561 B2 * | 11/2003 | Kraemer | 408/57 |
| 7,290,965 B2 | 11/2007 | Gaiser et al. | |
| 7,445,411 B2 | 11/2008 | Tchorny et al. | |
| 2003/0095841 A1 | 5/2003 | Kraemer | |
| 2008/0193234 A1 | 8/2008 | Davancens et al. | |
| 2010/0067994 A1 | 3/2010 | Nuzzi et al. | |
| 2010/0143055 A1 | 6/2010 | Kleiner et al. | |

FOREIGN PATENT DOCUMENTS

| | | | |
|---|---|---|---|
| DE | 4019428 | | 1/1992 |
| DE | 42 00 808 | | 9/1993 |
| DE | 19511257 A1 * | | 10/1995 |
| DE | 203 00 520 | | 5/2004 |
| DE | 103 47 755 | | 7/2004 |
| DE | 20 2004 00 8566 | | 11/2005 |
| DE | 102010002669 A1 * | | 9/2011 |
| EP | 419428 A1 * | | 3/1991 |
| FR | 2239849 A * | | 4/1975 |
| JP | 63084808 | | 4/1988 |
| JP | 3-82107 U * | | 8/1991 |
| JP | 04111708 A * | | 4/1992 |
| JP | 06031521 A * | | 2/1994 |
| JP | 08071825 A * | | 3/1996 |
| JP | 08300210 A * | | 11/1996 |
| JP | 10138047 A * | | 5/1998 |
| JP | 10151507 A * | | 6/1998 |
| JP | 11320227 A * | | 11/1999 |
| JP | 2003001511 A * | | 1/2003 |
| JP | 2004338000 A * | | 12/2004 |
| JP | 2005-14115 A * | | 1/2005 |
| JP | 2005-34976 A * | | 2/2005 |
| JP | 2010-264533 A * | | 11/2010 |
| WO | 92/03245 | | 3/1992 |

OTHER PUBLICATIONS

EPO website translation of DE 19511257, printed Nov. 2011.*
JPO website translation of JP 2004-338000, printed Nov. 2011.*
U.S. Appl. No. 12/552,618, filed Sep. 2, 2009, Kleiner et al.

* cited by examiner

ROTATABLY DRIVABLE CUTTING TOOL

This application is a continuation of International Application No. PCT/DE2008/000740 having an international filing date of Apr. 30, 2008, published in Germany on Nov. 27, 2008 under PCT Article 21(2), the entirety of which is incorporated herein by reference. This application claims benefit under 35 U.S.C. 119 sections (a)-(d) of German Application DE 10 2007 023 168.9, filed May 20, 2007, the entirety of which is incorporated herein by reference.

BACKGROUND OF THE INVENTION

The invention relates to a rotatably drivable cutting tool, for example, a fine machining tool such as a reamer.

Such tools must meet a wide variety of demands. On the one hand, increasingly higher machining accuracy is demanded of such tools, which requires a high dimensional accuracy of the blade positioning and a high stability during dynamic loading of the blades and shank. On the other hand, an increasingly longer service life is demanded of such tools, for which reason a coolant/lubricant supply system is regularly integrated in such tools. This coolant/lubricant supply system which is integrated in the tool is intended to ensure that the most loaded regions of the tool receive a sufficient supply of coolant/lubricant at any time during use.

There are various approaches in the prior art for designing generic tools with integrated coolant/lubricant supply systems.

The document DE 10347755 A1 discloses a generic tool configured as a high-speed reamer, in which a cutting head, which is connected in a rotationally and axially fixed manner to a shank part and can be fabricated from a hard material such as a sintered material, is supplied with coolant/lubricant by means of a central coolant/lubricant supply channel in the tool shank and a radial channel system in or at the interface to the cutting head. The radially outer mouth openings of the radial channel system are covered by a coolant-conducting sleeve which extends in the direction of the tool tip as far as a runout region of the flutes and can thus ensure that the supplied coolant/lubricant can be fed into the flutes with minimal losses.

This known coolant/lubricant supply system which is integrated into the shank tool is also suitable for what is known as MQL (Minimal Quantity Lubrication) technology, according to which the coolant/lubricant—in contrast to "wet machining"—is guided to the blades in a compressed air flow in an extremely low concentration. The lubricating medium is therefore supplied to the blades as an aerosol during machining, with the aim of producing a sufficient lubricating film in the direct vicinity of the cutting edges.

With MQL technology it is however necessary to conduct the lubricant to the blades in a precise dosage and as constant a concentration as possible. In order to achieve this object while at the same time reducing the fabrication outlay for producing the tool, the document DE 202004008566 U1 describes a high-speed reamer in which a sleeve on the chucking section extends as far as the flute runout region of the tool, wherein the sleeve is configured in one piece with the chucking section and receives the reamer shank in the interior in order to form axial coolant/lubricant channels. The lubricant channels which extend axially are supplied by a central lubricant channel in the chucking section in such a manner that the cooling channel has a constant cross section from the shank end as far as the flute runout region.

In the two known cases, the supply of the blades with coolant/lubricant can only be achieved by a correspondingly high outlay on the production of the tool. Furthermore, the known tools must be assembled from different components.

SUMMARY OF THE INVENTION

The invention is therefore based on the object of creating a rotatably drivable cutting tool of the type described above, which ensures the currently required service life of the blades and a simplified structure of the tool. A further object consists in creating a new method with which a fluid (for example, a coolant and/or lubricant) can be applied to highly loaded blades of a generic tool with low outlay but reliably and in sufficient quantities in both wet and dry machining (MQL technology).

This object is achieved by the methods and devices disclosed herein.

In some embodiments, coolant/lubricant channels are integrated in the chucking section of the tool in such a manner that the coolant/lubricant which emerges axially from these coolant/lubricant channels is fed on the outer side of the shank which leads to the cutting section into in each case one flute of the cutting section, but otherwise in a free-floating manner. It has been discovered by means of experiments that, with this design of the tools, both in what is known as wet machining, that is, with the use of liquid coolant/lubricants, and in what is known as "dry machining" according to MQL technology, a sufficient lubricant supply can be stabilized in the region of the flutes and also at the faces of the tool blades which are critical for the service life, even if the working pressure of the coolant/lubricant is kept at an easily controllable level of, for example, over 5 bar, preferably over 10 bar.

Investigations of the coolant/lubricant flow along the tool axis, that is from the chucking section to the tool tip, have shown that the fluid jet emerging from the coolant/lubricant channels has a sufficiently great core region with a high flow speed at the moment at which the tool penetrates the bore to be machined, in particular the through-bore which is to undergo fine post-machining, even if it has to cover a considerable axial length in the direction of the cutting head under the action of the arising centrifugal forces, without a radially outer limit. With increasing engagement length of the tool blades in the through-bore, even an increasingly stable flow profile forms in the individual flow channels which are defined by the flutes and the bore walls. This ensures that the tool blades are supplied with sufficient quantities of coolant/lubricant, in particular in the regions in which it is particularly important. Because the flow in these flow channels is more and more pronounced with increasing distance from the workpiece surface, the relatively highly loaded tool blade in the vicinity of the tool tip is also effectively cooled and lubricated. As a result, the service life of the tool can be kept at a high level.

The measures disclosed herein produce the additional advantage that the coolant/lubricant jets which emerge from the end-face discharge openings in the chucking section can be used particularly effectively for transporting away the swarf in the feed direction of the tool. This creates the possibility of equipping high-speed fine machining tools such as high-speed reamers with the above-mentioned integrated coolant/lubricant supply system.

Such high-speed reamers are operated at considerable cutting speeds. It has been shown however that the individual jets which emerge from the axial discharge openings are sufficiently stable to bring about the above-described effect of reliably filling the flow channels which are bounded by the flutes of the engaged cutting section, even with considerable centrifugal forces acting on the fluid jets and even at comparatively low flow medium pressures in the order of magnitude of approximately 5 to 10 bar, that is, flow medium pressures which are easily in the range of working pressures of conventional coolant/lubricant supply units. On the whole, the concept of tool design according to the invention therefore produces the advantage that the absolute quantity of coolant/lubricant in the flutes can be considerably increased by the supply of the coolant/lubricant on the outside.

The supply of coolant/lubricant to the points which are critical for the tool is low-loss, since deflections of the coolant/lubricant flow are avoided. The concept according to the invention is thus suitable not only for wet machining but also for what is known as dry machining or for minimal quantity lubrication (MQL technology). The flow speed, which is increased by the design according to the invention, of the coolant/lubricant in the flutes or in the swarf space in the axial direction can be used effectively to transport away swarf.

The integration of the coolant/lubricant supply system in the tool also creates the possibility of constructing the tool in one piece and with a low mass. This then produces particular advantages if the tool consists of a sinterable hard material, for example a solid hard metal or a cermet material, at least in the region of the chucking section and the adjacent shank. For example, if a VHM reamer with a nominal diameter of 8 mm is to be produced, a material saving on raw material of over 20% can be achieved. Since the design of the coolant/lubricant supply system integrated in tool manages with a greatly reduced tool volume in the region of the shank and the chucking section, the additional economic advantage of a reduced material removal rate is produced when manufacturing the tool. It is for example sufficient to grind the flutes just in the region of the cutting section. In the remaining region of the tool, that is, in the region of the shank and the chucking section, a cutting machining process can be completely omitted. The inner coolant/lubricant channels in the chucking section, and where applicable, the outer guide channels in the shank, can be created largely with its final dimensions as early as during fabrication of a sintered blank.

With respect to the method, it has been shown that the above-described aspect of sufficient supply with coolant/lubricant at the critical points of the cutting section can easily be ensured if the coolant/lubricant is supplied at a—previously customary—pressure of over 5 bar. The particular features of the respective application of the tool can be taken into account by varying the system pressure. For example, the system pressure is increased correspondingly with increasing length of the tool shank and/or with increasing centrifugal force acting on the individual coolant/lubricant jets. Advantageous configurations of the invention are the subject of the dependent claims.

The coolant/lubricant channels in the chucking section preferably in each case touch the outer diameter of the shank, as a result of which the individual coolant/lubricant jets on the way to the flutes are stabilised to such an extent that the coolant/lubricant throughput in the region of the cutting section and thus the blade-cooling and swarf-transporting effects as described above can be further improved.

At the same time, if the coolant/lubricant channel is enlarged radially inwards and is guided to the outer diameter of the shank, a further increased saving in material is produced in the case where the tool is manufactured from a sinterable material such as solid hard metal or a cermet material.

The coolant/lubricant channels which are formed in the chucking section can be radially open on the circumferential side. The coolant/lubricant channels are then closed by the chuck in the region of the chucking section.

In order to obtain more freedom for the geometric design of the cross section of the coolant/lubricant channels in the chucking section while realizing great chucking forces, it is of particular advantage to design the coolant/lubricant channels in the chucking section to be closed on the circumferential side. These inner channels can be introduced, for example extruded, as early as into the sintered blank with low production outlay and a high degree of shape accuracy when sintered materials such as solid hard metal or cermet materials are used. A further material saving on raw material is thereby produced. The shaping of the inner channels is accurate enough to achieve the effects of coolant/lubricant supply described at the start without having to subject the inner channels to a post-machining step. In addition, an improved stability of the tool is produced, which has advantages with respect to improved vibration damping and torque transmission.

A particularly good supply of the blades with coolant/lubricant and a particularly good transporting of the swarf, even if this is produced in large amounts, as is the case for example with high-speed reamers, may be produced with the development of fluid channels which are radially open. The flutes of a generic tool can have a comparatively complex shape. However, such complicated shapes of the cooling channel section can be realized with a good level of shape accuracy as early as in the sintered blank in particular if the coolant/lubricant channels which are provided in the chucking section are introduced in the preliminary forming process, such as in an extrusion process or a pressing process. With these measures, a maximum coolant/lubricant volumetric flow can be provided at such a radial distance from the tool axis that a particularly strong and pronounced coolant/lubricant flow is built up and stabilized in the flutes in the engagement region of the tool. As a result, the performance of the tool is further improved.

In some embodiments, the cross section of the discharge opening of the respective inner coolant/lubricant channel in the chucking section completely covers the flute in the cutting section or is at least coextensive with the said flute, as viewed in an axial projection.

In some embodiments, the respective axial discharge opening of the coolant/lubricant channels has a cross section which is adapted to the cross section of the associated flute.

If a complete overlapping of the cross sections of the discharge openings and the flutes, viewed in axial projection, is not possible, it is advantageous to adapt the cross section of the axial discharge opening with respect to position and/or shape of the geometry of the associated flute at least in such a manner that it captures or comes close to, preferably touches, the respective flank, which leads to the cutting edge, of the flute.

The advantages as described above still apply to a substantial extent if the flute is radially offset towards the inside by a certain amount with respect to the coolant/lubricant jet. This makes it possible for tools with different nominal working diameters to be produced from one and the same tool blank with inner coolant/lubricant channels in the chucking section. In that case, the chucking section and the geometry of the shank are kept the same, and a cutting machining process is carried out to varying extents to the final dimensions of the nominal working diameter and/or of the flutes only, in the region of the cutting section.

Experiments have shown that when the flute in the cutting section is radially offset somewhat towards the inside with respect to the cross section of the coolant/lubricant jet, the geometry of the cross section of the axial discharge opening can be matched to the geometry of the flute so that a speed profile is produced in the flutes in the engagement region of the tool which ensures particularly good supply with lubricant at the cutting face.

When the tool is produced from a hard material such as a sintered material such as hard metal or cermet, the inner coolant/lubricant channels can be produced as early as in the blank, that is, in a preliminary forming process.

The cross section of the axial discharge opening can be adapted in teems of its position and/or shape to the geometry of the associated flute in such a manner that as great a coverage as possible of the relevant cross-sectional areas is produced in axial projection. Depending on the application, the chucking section can have a different diameter from the cutting section. In order nevertheless to ensure sufficient supply of the cutting section with coolant/lubricant at the critical points in such a case, the coolant/lubricant channels in the chucking section can be routed at an approach angle to an associated flute of the cutting section. Cutting sections of a wide variety of sizes can be supplied with coolant/lubricant in this manner by varying the approach angle of the coolant/lubricant channels, without having to change the (standard) diameter of the chucking section of the tool.

In some embodiments, the loading of the flutes with individual, axially aligned coolant/lubricant jets is important for adequate supply of the tool blades with coolant/lubricant. In other embodiments, the tool can have one or more flutes that are not straight. For example, the flutes can also run in a spiral manner. If the flutes run in a straight line, that is, in an axially aligned manner, an even greater filling level of the flutes with coolant/lubricant can be achieved in the engagement region of the cutting section. This produces the further advantage that the production method is simplified, in that the grinding disc for grinding the flutes can at the same time be used for producing the guide depressions in the shank of the tool. Moreover, a tool which has straight flutes allows the tool to be produced in one piece in an extrusion process, which is particularly advantageous if a hard material, preferably a sintered material such as solid hard metal or cermet, is used as the material.

If at least the shank and the chucking section of the tool is produced from sinterable material such as solid hard metal or a cermet material, the coolant/lubricant channels in the chucking section and where applicable the guide depressions in the shank can be preformed in the tool blank to such an extent that post-machining after the sintering process is either no longer necessary at all or can remain restricted to a minimum. In addition to improved cost-effectiveness during production of the tool, material outlay on the required raw material is also at an minimum.

The rotatably drivable cutting tool can have a wide variety of applications. It can be configured for example as a fine machining tool, as a drilling tool, e.g., as a reamer, as a milling tool or as a thread-cutting tool. The tool in other embodiments is configured with a non-uniform distribution of the blade flutes around the circumference, that the supply of the blades with coolant/lubricant can be ensured for all the flutes with the same quality without having to increase outlay on production. Flow medium pressures in the range from 5 to 70 bar, for example, are sufficient for the adequate supply of the engaged blades of the tool for current geometries of the tools in question. This makes it possible to work with flow media of different consistencies, for example with liquid coolant/flow media, but also with aerosols as are used in dry machining or MQL technology.

In some embodiments, it may be possible to stabilize the individual coolant/lubricant jets which emerge from the chucking section in order to bridge longer axial distances between the chucking section and the cutting section in such a manner that the individual coolant/lubricant jets reach the associated flutes with the greatest area coverage possible.

BRIEF DESCRIPTION OF THE DRAWINGS

A plurality of embodiments are explained in more detail below with the aid of schematic drawings, in which:

FIGS. 1-3 show an embodiment of a rotatably drivable cutting drilling post-machining tool configured as a reamer, for example, as a high-speed reamer. The rotatably drivable cutting fine machining tool, which is indicated with the reference numeral 20, may be configured in one piece and may consist of a sintered material such as solid hard metal or a cermet material, for example, a sintered material which contains the carbides and nitrides of titanium (TiC, TiN) as the essential hardening constituents and in which nickel is predominantly used as the binder phase.

Figure 1:
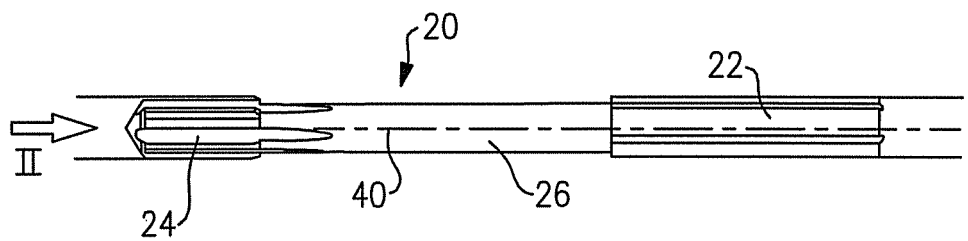
FIG. 1 shows a schematic side view of a rotatably drivable cutting tool according to the present inventive subject matter, configured as a reamer, according to a first embodiment.
Figure 2:
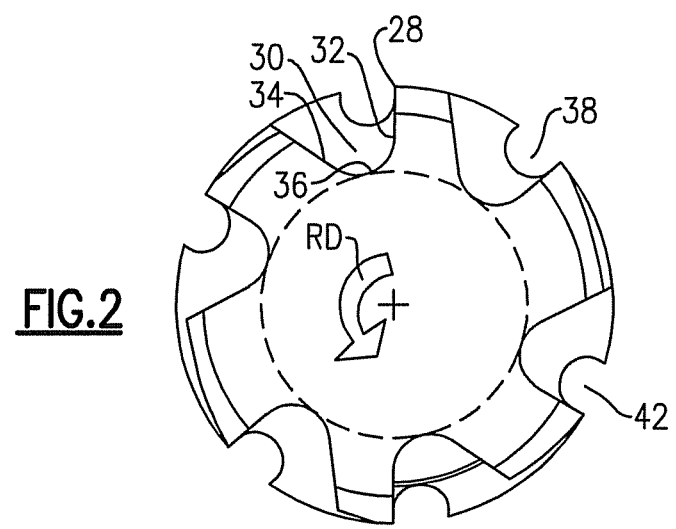
FIG. 2 shows the view according to "II" in FIG. 1 in an enlarged illustration.
Figure 3:
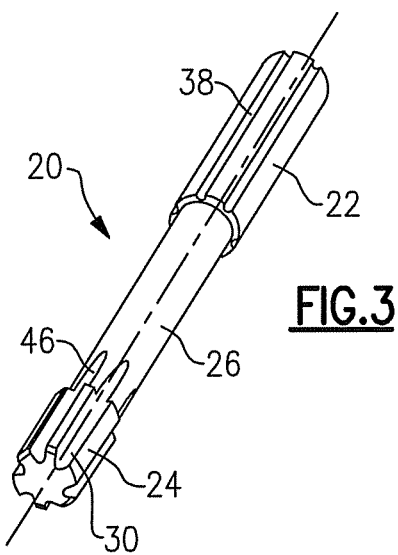
FIG. 3 shows a perspective view of the embodiments according to FIGS. 1 and 2.

The tool has three sections, namely a chucking section 22, a cutting section 24 and a shank section 26 which is arranged between them and has a reduced diameter. The cutting section 24 is grooved in straight lines and has a plurality of cutting edges 28 between which a flute 30 is situated in each case. The flute has essentially two flanks, namely a first flank 32 which leads towards the cutting edge and a second flank 34 which runs at an angle to this, and a rounded flute base 36 which lies between them (see FIG. 2). In the embodiment as shown in FIGS. 1-3, the cutting edges 28 are distributed non-uniformly over the circumference, which in high-speed reamers, which run at high speed, has the advantage of improved running smoothness and a reduced tendency to vibrate. The distribution can however also be uniform.

The special feature of the tool shown in FIGS. 1 to 6 consists in the configuration of the coolant/lubricant supply system which is integrated in the tool and is described in more detail below:

Inner coolant/lubricant channels 38 in the form of axial grooves are formed flush with the flutes 30 in the axial direction in the chucking section 22 and extend in each case parallel to the tool axis 40 and in each case form an axial discharge or mouth opening 42 on the side of the chucking section 22 which faces the cutting section 24.

The coolant/lubricant jets which emerge from the axial grooves shoot without lateral guidance in the axial direction radially outside the shank 26 to the cutting section 24 and meet in the flutes 30.

The cross section of the inner coolant/lubricant channels 38 and thus the mouth openings 42 are adapted to the cross sections of the associated flutes 30. They can be essentially coextensive with the cross sections of the flutes.

In the embodiment shown in FIGS. 1-3, the cross section of the axial discharge opening 42 is adapted with respect to position and/or shape to the geometry of the associated flute 30 in such a manner that it captures or comes close to, or touches, the respective flank, which leads to the cutting edge 28, of the flute, viewed in axial projection (FIG. 2).

In some embodiments, the cross section of the respective axial discharge opening 42 for the coolant/lubricant jet is provided with a cross section which is adapted to the cross section of the associated flute 30.

In the configuration according to FIGS. 1 to 3, the flute 30 is deeper than the outer diameter of the shank 26 and thus deeper than the groove base of the axial channels 38. The flutes 30 accordingly have a run-out section 46 to the shank 26.

When the tool is chucked in a tool holder, coolant/lubricant is fed at a pressure of, for example, 5 to 70 bar, by means of a suitable interface on the right-hand side in FIG. 1 of the chucking section 22. This can be liquid or gaseous flow medium which transports the lubricant, for example an aerosol, that is, compressed air which is mixed with lubricant droplets. The direction of rotation of the tool is indicated in FIG. 2 with the arrow RD. The grooves 38 are covered on the radial outer side by the chuck so that coolant/lubricant channels 38 are formed.

The coolant/lubricant which is fed by means of a conventional interface in the chucking section 22 thus flows at high speed through the coolant/lubricant channels 38 which are formed in the chucking section 22 and emerges with an axial alignment at the mouth openings 42. In the radially inner region, the individual coolant/lubricant jets are only virtually "guided" by the cylindrical circumferential face of the shank 26, but are otherwise free-floating.

The individual coolant/lubricant jets which are distributed over the circumference according to the division of the tool meet the flutes 30 after flowing so to speak in a free-floating manner.

As soon as the tool penetrates the bore, preferably a through-bore, to be machined, the flute is as far as possible closed over its entire circumference by the bore walls so that a virtually closed flow channel is created again for the fed coolant/lubricant. The flow medium which comes in this flow channel from the associated inner coolant/lubricant channels 38 and is collected has—as could be shown by experiments— such a high mass throughput, even at flow medium system pressures of over 5 bar, preferably of over 10 bar, that a flow profile is formed in the flutes which ensures that the cutting edges are reliably supplied with a sufficient quantity of lubricant. This ensures that the service life of the tool can be kept at an adequate level.

It was discovered by means of experiments that the through-flow quantity of the coolant/lubricant in the flutes depends on the profile shape of the coolant/lubricant channels which are formed in the chucking section.

The outer supply of the coolant/lubricant and the cross section, which is enlarged according to the present inventive subject matter, of the inner coolant/lubricant channels in the chucking section 22 ensures that the quantity of coolant/lubricant which is guided to the blades may be considerably increased compared to tools with a central, inner supply channel. This can be used not only to improve the service life of the blades but also at the same time to improve the transporting away of swarf.

The supply of the coolant/lubricant takes place in a very low-loss manner in the tool according to the present inventive subject matter, as multiple deflections are avoided. As a multiplicity of comparatively extensive coolant/lubricant channels are formed in the chucking section, a low weight and a low requirement for raw material is produced for the tool in the event that the tool is produced from a sintered blank.

The inner coolant/lubricant channels in the chucking section and also the flutes in the cutting section can be produced as early as in the sintered blank as far as possible with the final dimensions in the preliminary forming process. Machining of the inner cooling channels in the chucking section is then no longer necessary. Grinding of guide depressions in the shank can likewise be completely omitted. Cutting machining operations, namely grinding to final dimensions, are only necessary in the region of the cutting section, as a result of which a greatly reduced material removal rate is produced in the production of the tool.

The tool according to FIGS. 1 to 3 has been configured as a high-speed reamer with a nominal diameter of 8.0 mm. It could be proved using experiments that the centrifugal force acting on the individual coolant/lubricant jets does not adversely affect the supply of the blades with a sufficient quantity of coolant/lubricant. The material removal rate during manufacture, that is, when grinding flutes, is likewise restricted to a minimum in the described tool.

A sintered blank for a defined nominal diameter range of for example 6 to 8 mm can be used, with only slightly varying cutting machining operations being necessary.

Figure 4:
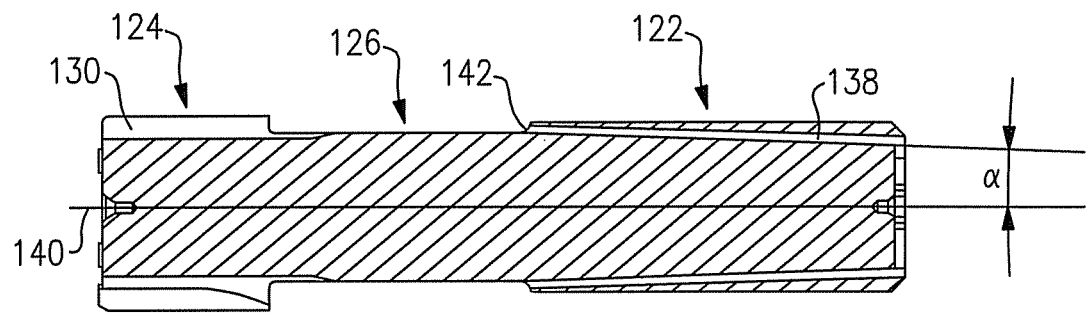
FIG. 4 shows a longitudinal section of the tool according to a second embodiment of the present inventive subject matter.

A second embodiment of the tool is described using FIG. 4. The components of tool which correspond to those of the embodiment according to FIGS. 1 to 3 are provided with similar reference symbols, but with a "1" in front.

The second embodiment corresponds essentially to the first embodiment with the exception that the coolant/lubricant channels 138 in the chucking section 122 do not extend parallel to the tool axis 140 but are routed at an approach angle α. The approach angle α is selected to be such that an imaginary extension of the coolant/lubricant channels 138 beyond the shank section 126 which lie in between is essentially aligned with the flutes 130 of the cutting section 124.

In the second embodiment shown in FIG. 4, the flutes 130 of the cutting section 124 lie on a greater pitch circle than the discharge openings 142 of the coolant/lubricant channels 138. However the reverse situation is also conceivable. The setting of the coolant/lubricant channels 138 towards the tool axis 140 means that the diameter of the chucking section 122 can be designed independently of that of the cutting section 124, and a resulting approximate difference in the radial distances of the mouth openings 142 and of the flutes 130 from the tool axis 140 can be compensated.

Figure 5:
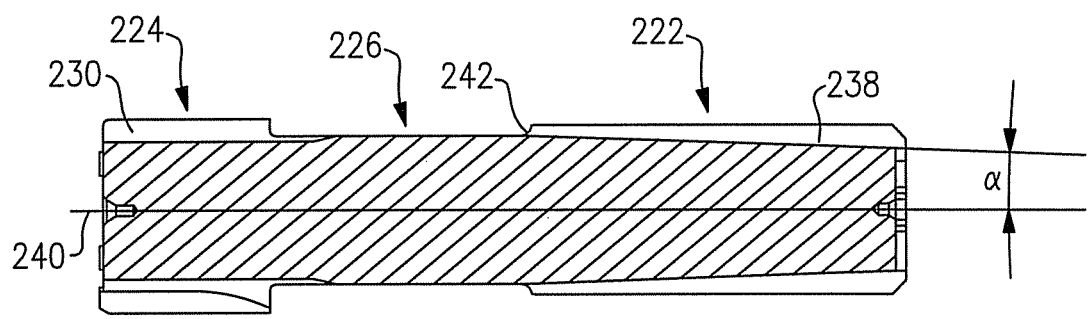
FIG. 5 shows a longitudinal section of the tool according to a third embodiment of the present inventive subject matter.

FIG. 5 shows a third embodiment of the tool. The components of the tool which correspond to those of the embodiment according to FIGS. 1 to 4 are provided with similar reference symbols, but with a "2" in front.

The tool according to the present inventive subject matter shown in FIG. 5 has radially open coolant/lubricant channels 238 in the chucking section 222, which are guided at an approach angle α to the tool axis 240 and are aligned via an imaginary extension beyond the shank part 226 essentially with the flutes 230 of the cutting section 224.

Of course, deviations from the described exemplary embodiments are possible without departing from the basic idea of the invention.

The outer diameter of the shank can, for example, be further reduced so that the channel 38 can be increased in cross section and be brought into greater coverage with the flute 30.

It is thus for example not absolutely necessary for the cutting head to be formed in one piece with the rest of the tool. The cutting head can also be attached in a rotationally and axially fixed manner to the shank in a known manner, for example soldered. The above-discussed advantages are all retained in this variant.

The tool itself does not necessarily have to be produced from a sintered material either.

The different functional sections of the tool can furthermore be provided with coatings which are known per se. Finally, the cutting section of the tool can also be equipped with cutting inserts.

All the above-described tools are configured as reamers. It should however be emphasised that the tool according to the present inventive subject matter can likewise be configured as a conventional drilling tool, as a milling tool or as a thread-cutting tool, for example.

In some embodiments which have straight flutes, additional advantages are produced in its production, in particular if the tool is produced from a sintered material blank which can for example be extruded or formed in a pressing process with already incorporated inner coolant/lubricant channels and/or guide depressions and/or prepared flutes.

The cutting section can however also be equipped with spiral flutes. In this case it can be advantageous if the cutting section is attached to the shank as a separate component.

The angled coolant/lubricant channels of the second and third embodiments can also branch off directly from a central coolant/lubricant channel, as a result of which corresponding radial connection channels between the coolant feed and the coolant/lubricant channels which are at a distance from the tool axis and are distributed in the circumferential direction are unnecessary.

The subject matter disclosed herein thus creates a rotatably drivable cutting tool, preferably configured as a fine machining tool such as a high-speed reamer, with an integrated coolant/lubricant supply system, for machining bores, for example, through-bores. The tool has a cutting section, on which a multiplicity of blades or cutting edges and flutes are formed, and a shank which forms a chucking section on a side which faces away from the cutting section. In order to supply the cutting edges effectively with coolant/lubricant while at the same time improving the cost-effectiveness of the production method, a number of coolant/lubricant channels which corresponds to the number of flutes is formed in the chucking section, which channels have in each case an axial discharge opening. The coolant/lubricant which emerges from the coolant/lubricant channels is fed in a virtually "free-floating" manner, where necessary supported by the outer diameter of the shank, into the associated flute of the cutting section.

The invention claimed is:

1. A tool comprising:
   a cutting section comprising a multiplicity of cutting edges and flutes;
   a shank section; and
   a chucking section, the shank section extending from the cutting section to the chucking section, wherein:
      peripheries of cross-sections through the chucking section perpendicular to an axis of the tool are substantially uniform over an entirety of the chucking section,
      the chucking section comprises a number of fluid channels which corresponds to the number of flutes, and
      for each of the fluid channels, fluid passing through the fluid channel travels from a first end of the chucking section to a second end of the chucking section, travels outside an outer radial periphery of the shank section from a region of the shank section that abuts the chucking section to a region of the shank section that abuts the cutting section, and enters into a respective flute in the cutting section.

2. The tool according to claim 1, wherein said fluid channels in the chucking section are closed on the circumferential side.

3. The tool according to claim 1, wherein said fluid channels in the chucking section are radially open.

4. The tool according to claim 1, wherein respective axial discharge openings of said fluid channels in the chucking section comprises a cross section which covers the cross section of the associated flute as viewed in an axial projection.

5. The tool according to claim 4, wherein each of the cross sections of the axial discharge openings captures or comes close to, the respective flank, which leads to the cutting edge, of the flute, viewed in axial projection.

6. The tool according to claim 1, wherein each of said fluid channels is aligned axially.

7. A tool comprising:
   a cutting section comprising a multiplicity of cutting edges and flutes;
   a shank section; and
   a chucking section, the shank section extending from the cutting section to the chucking section, wherein:
      peripheries of cross-sections through the chucking section perpendicular to an axis of the tool are substantially uniform over an entirety of the chucking section,
      the chucking section comprises a number of fluid channels which corresponds to the number of flutes,
      at least one fluid channel is radially open and is configured to be closed by a chuck, and
      for each of the fluid channels, fluid passing through the fluid channel travels from a first end of the chucking section to a second end of the chucking section, travels outside an outer radial periphery of the shank section, and enters into a respective flute in the cutting section.

8. The tool according to claim 1, wherein each of said flutes runs in a straight line.

9. The tool according to claim 1, wherein each of the freely emerging fluid jets is supported at least over a defined axial distance by an outer diameter of the shank section which is connected to the chucking section.

10. The tool according to claim 1, wherein the tool comprises a sintered material.

11. The tool according to claim 10, wherein each of said fluid channels is at least partially preformed in the tool blank.

12. The tool according to claim 1, wherein the tool is a drilling tool.

13. The tool according to claim 1, wherein the tool is a reamer.

14. The tool according to claim 1, wherein the tool is a milling tool.

15. The tool according to claim 1, wherein the tool is a thread-cutting tool.

16. A method for supplying the blades of a tool according to claim 1 with a pressurised fluid, wherein said fluid is supplied via the chucking section at a pressure of about between 5 and 80 bar.

17. A method according to claim 16, wherein said fluid is formed from an aqueous flow medium.

18. A method according to claim 16, wherein said fluid is formed from a gaseous fluid which is mixed with a flow medium.

19. A method according to claim 16, wherein the flow of said fluid in the chucking section is loaded with a swirl about the flow axis.

20. The method according to claim 16, wherein said fluid is supplied at a pressure of between about 10 and 70 bar.

21. The tool according to claim 1, wherein for at least one of the fluid channels, at least a portion of the fluid travels outside the outer radial periphery of the shank section in contact with a portion of the outer radial periphery of the shank section.

22. A tool comprising:
  a cutting section comprising a multiplicity of cutting edges and flutes;
  a shank section; and
  a chucking section, the shank section extending from the cutting section to the chucking section, wherein:
    peripheries of cross-sections through the chucking section perpendicular to an axis of the tool are substantially uniform over an entirety of the chucking section,
    the chucking section comprises a number of fluid channels which corresponds to the number of flutes,
    at least one fluid channel is radially closed and extends through at least a portion of the chucking section, and
    for each of the fluid channels, fluid passing through the fluid channel travels from a first end of the chucking section to a second end of the chucking section, emerges from an axial discharge at the second end of the chucking section, travels outside an outer radial periphery of the shank section, and enters into a respective flute in the cutting section.

\* \* \* \* \*